US009954227B2

(12) United States Patent
Delacourt et al.

(10) Patent No.: US 9,954,227 B2
(45) Date of Patent: Apr. 24, 2018

(54) CRYSTALLINE NANOMETRIC LIFEPO$_4$

(75) Inventors: Charles Delacourt, Lignières-Châtelain (FR); Philippe Poizot, Amiens (FR); Christian Masquelier, Amiens (FR)

(73) Assignee: Umicore, Brussels (BE)

( * ) Notice: Subject to any disclaimer, the term of this patent is extended or adjusted under 35 U.S.C. 154(b) by 1014 days.

(21) Appl. No.: 11/993,925

(22) PCT Filed: Jun. 15, 2006

(86) PCT No.: PCT/EP2006/005725
§ 371 (c)(1),
(2), (4) Date: Jun. 3, 2008

(87) PCT Pub. No.: WO2007/000251
PCT Pub. Date: Jan. 4, 2007

(65) Prior Publication Data
US 2008/0241690 A1    Oct. 2, 2008

Related U.S. Application Data

(60) Provisional application No. 60/699,877, filed on Jul. 18, 2005.

(30) Foreign Application Priority Data

Jun. 29, 2005  (EP) .................................. 05291406

(51) Int. Cl.
*C01B 25/45*     (2006.01)
*H01M 4/58*      (2010.01)
(Continued)

(52) U.S. Cl.
CPC .......... *H01M 4/5825* (2013.01); *C01B 25/37* (2013.01); *H01M 10/052* (2013.01); *H01M 10/0565* (2013.01); *Y10T 428/2982* (2015.01)

(58) Field of Classification Search
CPC .... C01B 25/37; C01B 25/375; H01M 4/5825; H01M 10/52; H01M 10/0565
(Continued)

(56) References Cited

U.S. PATENT DOCUMENTS 5,910,382 A      6/1999  Goodenough et al.
5,958,568 A *    9/1999  Mizutani .............. G11B 5/7305
                                                 428/213

(Continued)

FOREIGN PATENT DOCUMENTS

EP       1094533       4/2001
EP       1 184 920     3/2002
(Continued)

OTHER PUBLICATIONS

Scaccia et al., "Morphological investigation of sub-micron FePO4 and LiFePO4 particles for rechargeable lithium batteries," 2003, Materials Research Bulletin, 38, pp. 1155-1163.*
(Continued)

*Primary Examiner* — Jun Li
(74) *Attorney, Agent, or Firm* — Brinks Gilson & Lione

(57) ABSTRACT

The present invention relates to lithium secondary batteries and more specifically to positive electrode materials operating at potentials greater than 2.8 V vs. Li$^+$/Li in nonaqueous electrochemical cells. In particular, the invention relates to crystalline nanometric carbon-free olivine-type LiFePO$_4$ powders with enhanced electrochemical properties. A direct precipitation process is described for preparing crystalline LiFePO$_4$powder, comprising the steps of: —providing a water-based mixture having at a pH between 6 and 10, containing a water-miscible boiling point elevation additive, and Li$^{(I)}$, Fe$^{(II)}$ and P$^{(V)}$ as precursor components; —heating said water-based mixture to a temperature less than or equal to its boiling point at atmospheric pressure, thereby precipi-
(Continued)

Figure 1:
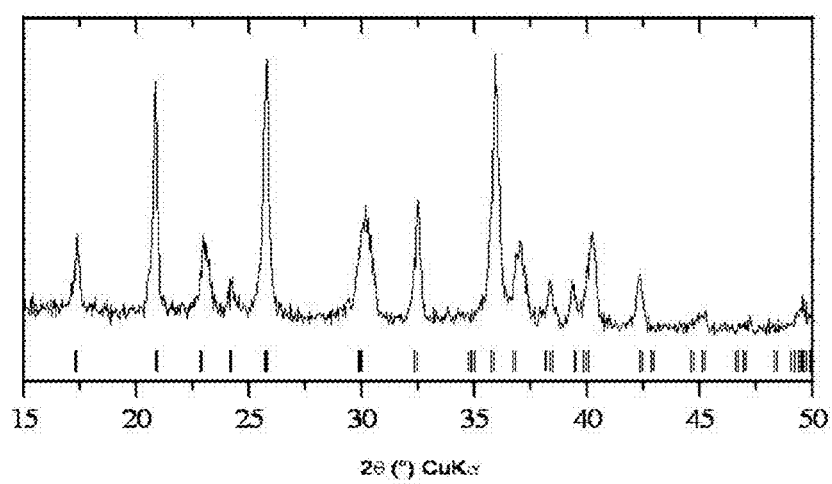

tating crystalline LiFePO4 powder. An extremely fine 50 to 200 nm particle size is obtained, with a narrow distribution. The fine particle size accounts for excellent high-drain properties without applying any carbon coating. This allows for a significant increase in the active material content of the electrode. The narrow distribution facilitates the electrode manufacturing process and ensures a homogeneous current distribution within the battery.

4 Claims, 2 Drawing Sheets

(51) Int. Cl.
  *C01B 25/37* (2006.01)
  *H01M 10/052* (2010.01)
  H01M 10/0565 (2010.01)

(58) Field of Classification Search
  USPC .......................................... 423/306; 429/221
  See application file for complete search history.

(56) References Cited

U.S. PATENT DOCUMENTS

| | | | |
|---|---|---|---|
| 6,165,642 A | 12/2000 | Kawakami et al. | |
| 6,440,606 B1 | 8/2002 | Yoshizawa et al. | |
| 6,855,273 B2 | 2/2005 | Ravet et al. | |
| 7,491,468 B2 | 2/2009 | Okada et al. | |
| 2002/0192137 A1* | 12/2002 | Chaloner-Gill | H01M 4/5825 423/306 |
| 2003/0203205 A1* | 10/2003 | Bi | B22F 1/0014 428/402 |
| 2004/0033360 A1 | 2/2004 | Armand et al. | |
| 2004/0086445 A1 | 5/2004 | Armand et al. | |
| 2004/0151649 A1 | 8/2004 | Hemmer et al. | |
| 2004/0175614 A1 | 9/2004 | Wurm et al. | |
| 2006/0204848 A1 | 9/2006 | Franger et al. | |
| 2007/0054187 A1* | 3/2007 | Nuspl et al. ............... 429/218.1 | |

FOREIGN PATENT DOCUMENTS

| | | |
|---|---|---|
| EP | 1 379 468 | 1/2004 |
| IT | 2001RM0463 A1 * | 7/2001 |
| JP | 10-312789 | 11/1998 |
| JP | 2001110455 | 4/2001 |
| JP | 200275368 | 3/2002 |
| JP | 2002151082 | 5/2002 |
| JP | 2004-095385 | 3/2004 |
| WO | WO 02/27824 | 4/2002 |
| WO | WO 02/083555 | 10/2002 |
| WO | WO 02/099913 | 12/2002 |
| WO | WO 2004/001881 | 12/2003 |
| WO | WO 2004036671 | 4/2004 |
| WO | WO 2004/056702 | 7/2004 |
| WO | WO 2005/051840 | 6/2005 |
| WO | WO 2005/051840 A1 * | 6/2005 |

OTHER PUBLICATIONS

Prosini et al., IT 2001 RM0463 translation, Jul. 2001.*
Lee et al., "Batch and continuous hydrothermal synthesis of LiFePO4 micro- and nanoparticles," 2004, AIChE Annual Meeting, Conference Proceedings, Austin, TX, United States, Nov. 7-12, 2004, pp. 1-3.*
Prosini et al., "Long-Term Cyclability of Nanostructured LiFePO$_4$," Electrochimica Acta, vol. 48, (2003), pp. 4205-4211.
Arnold, G., et al., "Fine-particle lithium iron phosphate LiFePO$_4$ synthesized by a new low-cost aqueous precipitation technique", Journal of Power Sources, 2003, p. 247-251, vol. 119-121.
Chen, Zhaohui, et al., "Reducing Carbon in LiFePO$_4$/C Composite Electrodes to Maximize Specific Energy, Volumetric Energy, and Tap Density", Journal of The Electrochemical Society, 2002, p. A1184-A1189, vol. 149.
Delacourt, C., et al., "One Step Low-Temperature Route for the Preparation of Electrochemically Active LiMnPO$_4$ Powders", Chem. Mater., 2004, p. 93-99, vol. 16.
Delacourt, C., et al., "Low temperature preparation of optimized phosphates for Li-battery applications", Solid State Ionics, 2004, p. 113-118, vol. 173.
Delacourt, C. et al., "Toward Understanding of Electrical Limitations (Electronic, Ionic) in LiMPO$_4$(M=Fe, Mn) Electrode Materials", Journal of The Electrochemical Society, 2005, p. A913-A921, vol. 152.
Franger, S., et al., "Comparison between different LiFePO$_4$ synthesis routes and their influence on its physico-chemical properties", Journal of Power Sources, 2003, p. 252-257, vol. 119-121.
Huang, H., et al., "Approaching Theoretical Capacity of LiFePO$_4$ at Room Temperature at High Rates", Electrochemical and Solid-State Letters, 2001, p. A170-A172, vol. 4.
Padhi, A. K., et al., "Phospho-olivines as Positive-Electrode Materials for Rechargeable Lithium Batteries", J. Electrochem. Soc., 1997, p. 1188-1194, vol. 144.
Striebel, K., et al., "Comparison of LiFePO$_4$ from Different Sources", Journal of The Electrochemical Society, 2005, p. A664-A670, vol. 152.
Yamada, A., et al., "Optimized LiFePO$_4$ for Lithium Battery Cathodes", Journal of The Electrochemical Society, 2001, p. A224-A229, vol. 148.
Yang, S., et al., "Hydrothermal synthesis of lithium iron phosphate cathodes", Electrochemistry Communications, 2001, p. 505-508, vol. 3.
Whittingham, "Lithium Batteries and Cathode Materials," Chemical Reviews, vol. 104, No. 10, (2004), pp. 4271-4301.
Arico, A.S., et al., "Nanostructured Materials for Advanced Energy Conversion and Storage Devices", Nature Materials, vol. 4 (May 2005), pp. 366-377.
Mussini, T., et al., "Criteria for Standardization of pH Measurements in Organic Solvents and Water + Organic Solvent Mixtures of Moderate to High Permittivities", Pure & Appl. Chem., vol. 57, No. 6 (1985), pp. 865-876.
Tajimi, S., et al., "Enhanced Electrochemical Performance of LIFePO4 Prepared by Hydrothermal Reaction", Solid State Ionics, vol. 175 (2004), pp. 287-290.
CRC Handbook of Chemistry and Physics, $93^{rd}$ Edition (2012), pp. 4-68.
Horiba Scientific: A Guidebook to Particle Size Analysis, Horiba Instruments, Inc, (2012), pp. 1-29.
Nuspl, G., et al., "Ultrafine LiFePO$_4$ Synthesized by an Optimized Hydrothermal Process", The Electrochemical Society, Abstract 293, IMLB 12 Meeting (2004).

* cited by examiner

CRYSTALLINE NANOMETRIC LIFEPO$_4$

This application is a National Stage application of International Application No. PCT/EP2006/005725 filed Jun. 15, 2006, which claims the benefit of U.S. Provisional Application No. 60/699,877, filed Jul. 18, 2005 and European Patent Application No. 05291406, filed Jun. 29, 2005, the entire contents of each are hereby incorporated herein by reference.

The present invention relates to lithium secondary batteries and more specifically to positive electrode materials operating at potentials greater than 2.8 V vs. Li$^+$/Li in non-aqueous electrochemical cells. In particular, the invention relates to crystalline nanometric carbon-free olivine-type LiFePO$_4$ powders with enhanced electrochemical properties, made by a direct precipitation method.

Lithium secondary batteries are widely used in consumer electronics. They benefit from the light weight of Li and from its strong reducing character, thus providing the highest power and energy density among known rechargeable battery systems. Lithium secondary batteries are of various configurations, depending on the nature of the electrode materials and of the electrolyte used.

Current commercial Li-ion systems typically use LiCoO$_2$ and carbon graphite as positive and negative electrodes respectively, with LiPF$_6$ in EC/DEC/PC as a liquid electrolyte. The theoretical voltage of the battery is related to the difference between thermodynamic free energies of the electrochemical reactions at the negative and positive electrodes. Solid oxidants are therefore required at the positive electrode. The materials of choice, up to now, are either the layered LiMO$_2$ oxides (with M is Co, Ni and/or Mn), or the 3-dimensional spinel structure of LiMn$_2$O$_4$. De-insertion of Li from each of these oxides is concomitant with the M$^{3+}$ into M$^{4+}$ oxidation, occurring between 3.5 and 5 V vs. Li$^+$/Li.

In U.S. Pat. No. 5,910,382, three-dimensional framework structures using $(XO_4)^{n-}$ polyanions have been proposed as viable alternatives to the LiM$_x$O$_y$ oxides. Among these compounds, olivine-type LiFePO$_4$ appears to be the best candidate, since the Fe$^{3+}$/Fe$^{2+}$ potential is located at an attractive value of 3.5 V vs. Li$^+$/Li. Pioneering work of Padhi at al., J. Electrochem. Soc., 144(4) (1997), 1188, demonstrated the reversible extraction/insertion of Li$^+$ ions from the olivine-type LiFePO$_4$ prepared by a solid state reaction at 800° C. under Ar atmosphere, starting from Li$_2$CO$_3$ or LiOH.H$_2$O, Fe$^{(II)}$ acetate and NH$_4$H$_2$PO$_4$.H$_2$O. Due mainly to electrical limitations, the capacity of the active material was only 60 to 70% of the theoretical capacity, which is 171 mAh/g, whatever the charge or discharge rate applied. It is indeed known that the use of high synthesis temperatures (i.e. above 700° C.) leads to the formation of large particles, in which ionic and electronic conductivity is a limiting factor.

More recent work has been devoted to eliminate the electronic conductivity limitation. This can be achieved by coating the LiFePO$_4$ particles with a conducting phase. Besides the basic physical techniques such as ball-milling of LiFePO$_4$ with carbon black as disclosed in WO 02/099913, other synthesis routes consist in forming carbon-coated LiFePO$_4$ by annealing an intimate mixture of the precursors and a carbon source, as is disclosed in EP 1184920 and U.S. Pat. No. 6,855,273. More complex methods were also developed, in which LiFePO$_4$ and a surrounding conductive carbon coating were simultaneously formed, for example in Huang et al., Electrochem. Solid State Lett., 4(10), A170-A172 (2001), and WO 2004/001881.

Nevertheless, despite all these improvements, two important problems remain unsolved regarding the use of carbon-coated LiFePO$_4$ in Li-ion batteries. The first one has been described by Chen et al., in J. Electrochem. Soc., 149 (2002), A1184, where it was shown that the presence of carbon in the LiFePO$_4$ powder had a dramatic impact on the tap density of the powder, the latter being reduced by a factor 2 with only 2 wt. % carbon in the carbon-coated LiFePO$_4$, thereby leading to energy densities which are only half of those of standard materials such as LiCoO$_2$.

The second problem has been raised by Striebel et al. in J. Electrochem. Soc., 152 (2005), A664-A670, where a compilation of tests of various carbon-coated LiFePO$_4$ compounds was published. The author insists on the fact that, even if the matrix conductivity has been improved by coating, the battery developer would welcome so-far inexistent compounds having a primary particle size in the 50 to 100 nm range and, overall, attempts should be made to minimise the particle size distribution, in order to yield better power efficiency. In addition, Delacourt et al. in J. Electrochem. Soc., 152 (2005), A913-A921, demonstrated that the conductivity of LiFePO$_4$ was mainly of electronic nature, which led to the conclusion that the main electrical limitation of this compound is due to the Li$^+$ ion transport mechanism.

These recently published results emphasise the need for a carbon-free material, which does not exhibit the above cited problems, and which has a reduced primary particle size in order to shorten Li$^+$ diffusion lengths and ohmic drop, as well as a narrow size distribution, in order to ensure a homogeneous current distribution in the electrode and thus achieve better battery performances, i.e. a high power efficiency and a long cycle life.

In order to produce fine carbon-free LiFePO$_4$, ceramic synthesis methods, based on the physical mixing of the precursors, have to be avoided, as they lead to micron-sized powders which do not give any significant capacity at high rates, as was shown by Padhi et al., in J. Electrochem. Soc., 144(4) (1997), 1188, and Yamada et al., J. Electrochem. Soc., 148 (3) (2001), A224. An alternative consists in dissolving the Li, Fe and P precursors in an aqueous solution, followed by the formation of an amorphous Li/Fe/P mixture by water evaporation. This dry precipitate is further heat-treated at around 500 to 700° C. for crystallisation of the LiFePO$_4$, as is disclosed in WO 02/27824 and EP 1379468. This alternative method allows making submicron particles in the 0.5 to 1 μm range, but the particle size distribution is so broad that these powders are not suitable for use as such in batteries.

The best results so far have been obtained by hydrothermal synthesis, as reported by Yang et al., in Electrochem. Comm., 3, 505-508 (2001). Reference is also made to JP2004-095385A1. In this synthesis, the particle size as well as the particle size distribution (psd) is largely dependent on the process used: Franger et al., in J. Power Sources, 119-121, 252-257 (2003) and WO 2004/056702, developed a process leading to particles in the 1-20 μm range, while Nuspl et al. presented in Proceedings of the IMLB 12 Meeting, Nara, Japan, June 2004, ISBN 1-56677-415-2, Abs. 293, an optimised hydrothermal technique yielding a carbon-free powder with a narrow particle size distribution and an average particle size in the 400 to 600 nm range, and no particles above 1.3 μm. Although useable without any carbon coating at low discharge rates, the particle size is still far away from the 50 to 200 nm range that is needed for adequate in-battery performance at high rates.

It is therefore the objective of this invention to disclose a novel process yielding metal phosphate powders which offer essential improvements over the materials cited above.

To this end, a process is provided for preparing crystalline $LiFePO_4$ powder, comprising the steps of:

providing a water-based mixture having at a pH between 6 and 10, containing a water-miscible boiling point elevation additive, and $Li^{(I)}$, $Fe^{(II)}$ and $P^{(V)}$ as precursor components;

heating said water-based mixture to a temperature less than or equal to its boiling point at atmospheric pressure, thereby precipitating the $LiFePO_4$ powder.

At least part of the $Li^{(I)}$ can be introduced as LiOH, while at least part of the $P^{(V)}$ can be introduced as $H_3PO_4$. The correct pH can usefully be reached by adjusting the ratio of $H_3PO_4$ to LiOH. The obtained $LiFePO_4$ powder can advantageously be heated it in non-oxidising conditions, at a temperature below 600° C., preferably above 200° C. and more preferably above 300° C.

The atmospheric boiling point of the water-based mixture is preferably above 100° C. and below 200° C., and more preferably from 105 to 120° C. Use is made of a water-miscible additive as a co-solvent. Useful co-solvents should have a boiling point higher than 100° C. at atmospheric pressure. Ethylene glycol, diethylene glycol, N-methyl formamide, dimethyl formamide, hexamethyl phosphoric triamide, propylene carbonate and tetramethyl sulfone are appropriate examples; dimethyl sulfoxide (DMSO) is particularly well suited. It is however difficult to find co-solvents allowing stable operation at temperatures above 120° C., let alone above 200° C.

The invention also concerns a carbon-free crystalline $LiFePO_4$ powder for use as electrode material in a battery, having a particle size distribution with an average particle size d50 below 200 nm, and preferably above 50 nm. The maximum particle size is advantageously below 500 nm and the particle size distribution mono-modal with a ratio (d90–d10)/d50 of less than 0.8, preferably less than 0.65, and more preferably less than 0.5.

In another embodiment, the use of a carbon-free crystalline $LiFePO_4$ powder for the manufacture of a lithium insertion-type electrode, by mixing said powder with a conductive carbon-bearing additive, is disclosed, and the corresponding electrode mixture is claimed.

When dealing with electrode mixtures for secondary lithium-batteries with non-aqueous liquid electrolyte, the mix may comprise at least 90% by weight of the invented $LiFePO_4$, and is then characterised by a reversible capacity of at least 80%, and preferably at least 85% of the theoretical capacity, when used as an active component in a cathode which is cycled between 2.70 and 4.15 V vs. $Li^+/Li$ at a discharge rate of 1 C at 25° C. The amount of additives (binder and carbon) in the electrode mixture can be limited to less than 10% because the mixture, being pasted on a current collector, needs not to be self-supporting for this type of batteries.

When dealing with electrode mixtures for secondary lithium-batteries with non-aqueous gel-like polymer electrolyte, the mix may comprise at least 80% by weight of the invented $LiFePO_4$, and is then characterised by a reversible capacity of at least 80%, and preferably at least 85% of the theoretical capacity, when used as an active component in a cathode which is cycled between 2.70 and 4.15 V vs. $Li^+/Li$ at a discharge rate of 1 C at 25° C. The amount of additives in the electrode mixture can be as high as 20% in this case, because the mixture, being rolled in the form of a sheet to be laminated to a current collector, needs to be self-supporting during assembly of this type of batteries. However, in case of lithium-batteries with non-aqueous dry polymer electrolyte, the mix may comprise at least 56% by weight of the invented $LiFePO_4$ as dry polymer electrolyte enters directly in the composition of the electrode material.

The details of the invention are illustrated by the following figures:

FIG. 1: XRD (Cu Kα) diagram of the as-obtained precipitate after 1 hour reaction time under boiling conditions at 108 to 110° C.

Figure 2:
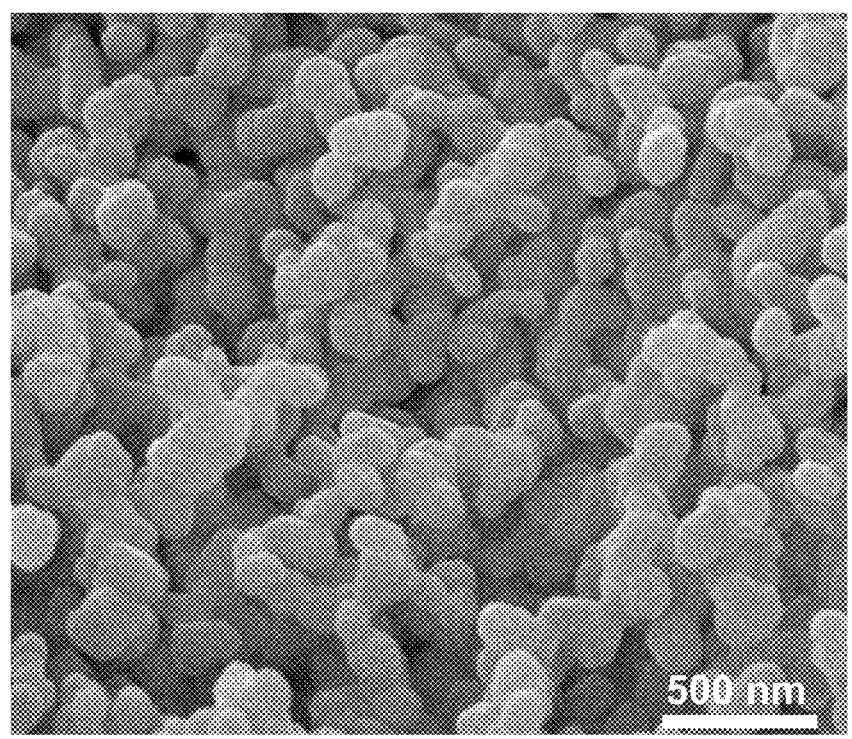

FIG. 2: SEM picture of the product of the invention.

Figure 3:
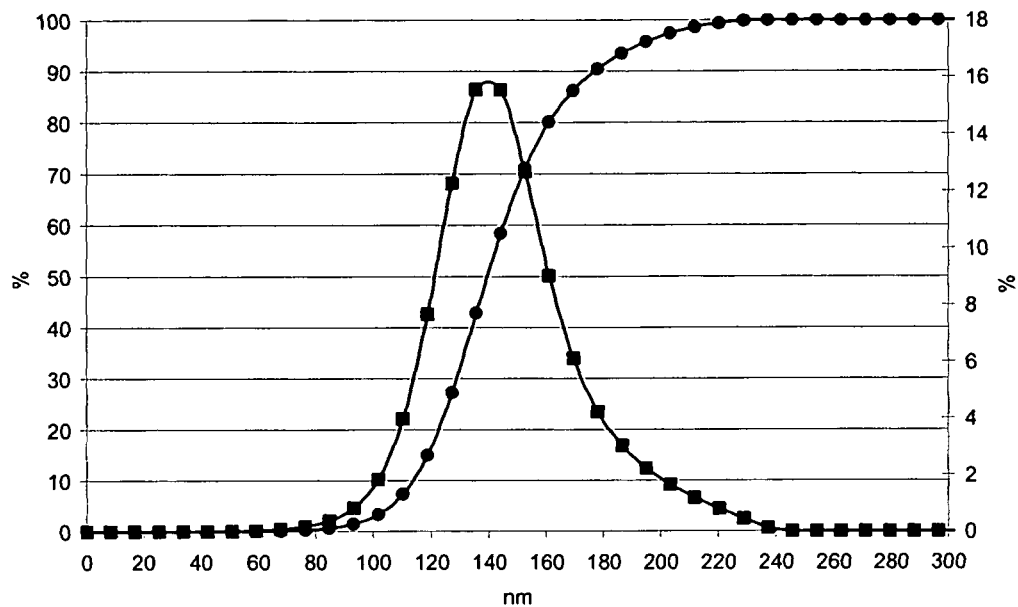

FIG. 3: Volumetric particle size distribution (% vs. nm) obtained from image analysis on SEM pictures of the product of the invention.

Figure 4:
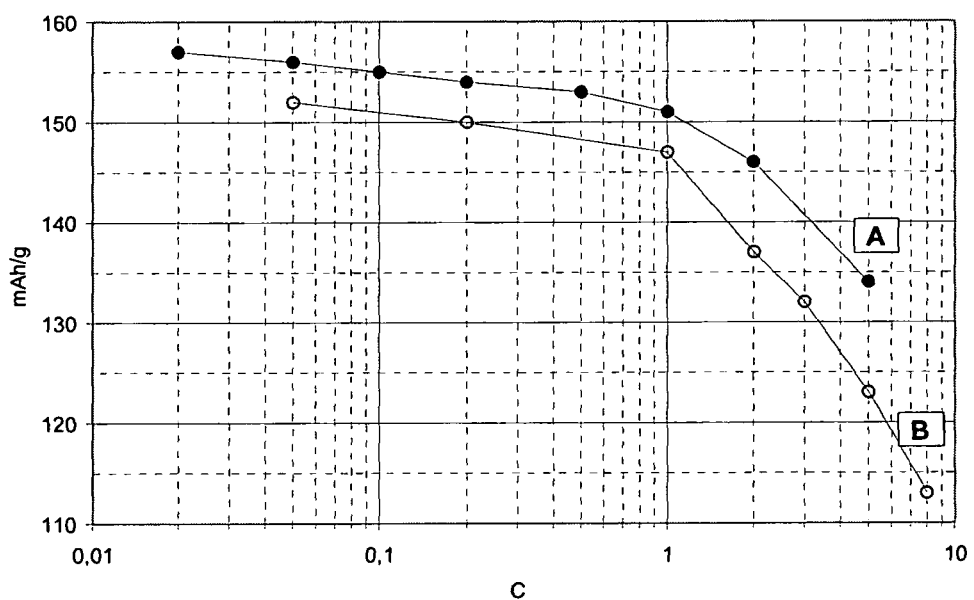

FIG. 4: Specific capacity relative to the active material as a function of the discharge rate (mAh/g vs. C) for the $Li/LiPF_6$ EC:DMC/$LiFePO_4$ system. A: using the invented product; B: according to prior art.

The fact that the precipitated particles are of nanometric size accounts for the excellent high-drain properties of the batteries. This allows omitting carbon coating, a mandatory step in the manufacture of all presently available powders if they are to be usefully incorporated in a battery. The omission of carbon coating permits a significant increase of the active material content of the electrode.

The particularly narrow particle size distribution facilitates the electrode manufacturing process and ensures a homogeneous current distribution within the battery. This is especially important at high discharge rates, where finer particles would get depleted more rapidly than coarser particles, a phenomenon leading to the eventual deterioration of the particles and to the fading of the battery capacity upon use.

Carbon-free crystalline nanometric $LiFePO_4$ powder, with particles in the 50 to 200 nm range and a very narrow particle size distribution may thus be obtained directly from solution at atmospheric pressure by choosing appropriate working temperatures and pH. Thermodynamic calculations have shown that $Li_3PO_4$ and $Fe_3(PO_4)_2.xH_2O$ coexist at temperatures up to 100° C. However, by heating the solution above this temperature, and preferably at or above 105° C., the chemical equilibrium is shifted towards the formation of pure $LiFePO_4$: $Li_3PO_4 + Fe_3(PO_4)_2.xH_2O \rightarrow 3\ LiFePO_4 + x H_2O$. For this to occur, the pH should be between 6.0 and 10.0, and preferably between 7.0 and 7.5.

It is interesting to note that well crystallised pure $LiFePO_4$ is already obtained after less than one hour at 108 to 110° C., as shown in FIG. 1. This indicates that nucleation and growth are very fast, which accounts for the nanometric size of the particles obtained. A longer residence time may further improve the crystallinity.

It is well-known that nanometric $SiO_2$ or $Al_2O_3$ particles can be added to a solution in order to act as nuclei for the precipitation of crystals. This could facilitate the nucleation of the $LiFePO_4$ with respect to the present invention. Also known is that adding surfactants may help improve the dispersion of precipitates. This could prevent particle agglomeration and may allow working with higher feed concentration with respect to the invented $LiFePO_4$ synthesis.

The obtained precipitate could contain traces or, occasionally, up to 15 to 20 at. % of $Fe^{(III)}$, as confirmed by Mössbauer spectroscopy, and a small amount of hydroxyl groups, as indicated by IR and TGA measurements. A short thermal treatment under slightly reducing atmosphere above 200° C. may thus be advisable to enhance the purity of the $LiFePO_4$ powder. Relatively mild conditions are useful so as to avoid grain growth or sintering: less than 5 hours at a temperature below 600° C. is preferred. The resulting powder is shown in FIG. 2. Noteworthy is that, as the crystalline triphylite LiFePO$_4$ phase is already formed during the precipitation step, the temperature and the dwell time of the thermal treatment are significantly reduced compared to a ceramic synthesis process.

This invention is further illustrated in the following example.

EXAMPLE

In a first step, DMSO is added to an equimolar aqueous solution of 0.1 M Fe$^{(II)}$ in FeSO$_4$.7H$_2$O and 0.1 M P$^{(V)}$ in H$_3$PO$_4$, dissolved in H$_2$O under stirring. The amount of DMSO is adjusted in order to reach a global composition of 50 vol. % water and 50 vol. % dimethyl sulfoxide.

In a second step, an aqueous solution of 0.3 M LiOH.H$_2$O is added to the solution at 25° C., in order to increase the pH up to a value comprised between 7 and 7.5. Hence, the final Li:Fe:P molar ratio in the solution is close to 3:1:1.

In a third step, the temperature of the solution is increased up to the solvent's boiling point, which is 108 to 110° C., whereby LiFePO$_4$ begins to precipitates. After one hour, the precipitate is filtered and washed thoroughly with H$_2$O.

A thermal treatment is finally performed by putting the dry precipitate at 500° C. for 3 hours in a slightly reducing N$_2$/H$_2$ (95/5) gas flow.

The volumetric particle size distribution of the product was measured using image analysis. As shown in FIG. 3, the d50 value is about 140 nm, while the relative span, defined as (d90−d10)/d50, is about 0.50.

A slurry was prepared by mixing 95% of the invented LiFePO$_4$ powder with 5 wt. % of ketjen carbon black and N-methyl-2-pyrrolidone (NMP) and deposited on an aluminium current collector. The obtained electrode was used to manufacture coin cells, using a loading of 3 mg/cm$^2$ active material. FIG. 4 shows that an excellent discharge capacity is maintained up to at least a discharge rate of 5C (curve A). The capacity at 1 C is 151 mA/g, corresponding to 88% of the theoretical capacity of LiFePO$_4$. As a comparative example, results as reported by Nuspl et al. (curve B) show a lower overall reversible capacity and higher losses, especially at rates above 1 C, even though only 79% of active material was used in the electrode mixture, together with a loading of only 2.3 mg/cm$^2$. The lower active material content and the lower loading indeed tend to give an upward bias to the measured reversible capacity.

The capacity retention using the invented product proved also excellent, as no significant degradation was apparent after 200 charge-discharge cycles at C/2 and at 5C. The capacity of the cells indeed appeared to fade by less than 0.04% per cycle in the above discharge conditions, a performance deemed to be on par with the current industrial demand.

The invention claimed is:

1. A carbon-free crystalline LiFePO$_4$ powder having a particle size distribution with an average particle size d50 below 200 nm, wherein the particle size distribution ratio (d90−d10)/d50 is less than 0.8 and wherein the maximum particle size is below 500 nm.

2. The carbon-free crystalline LiFePO$_4$ powder according to claim 1, wherein the average particle size d50 is below 200 nm and above 50 nm.

3. The carbon-free crystalline LiFePO$_4$ powder according to claim 1, wherein the particle size distribution is monomodal and the ratio (d90−d10)/d50 is less than 0.65.

4. The carbon-free crystalline LiFePO$_4$ powder according to claim 1, wherein the particle size distribution is monomodal and the ratio (d90−d10)/d50 is less than 0.5.

* * * * *